United States Patent
Boenapalli et al.

(10) Patent No.: US 10,762,336 B2
(45) Date of Patent: Sep. 1, 2020

(54) FACE RECOGNITION IN LOW LIGHT CONDITIONS FOR UNLOCKING AN ELECTRONIC DEVICE

(71) Applicant: QUALCOMM Incorporated, San Diego, CA (US)

(72) Inventors: Madhu Yashwanth Boenapalli, Hyderabad (IN); Venu Madhav Mokkapati, Hyderabad (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/967,866

(22) Filed: May 1, 2018

(65) Prior Publication Data

US 2019/0340421 A1   Nov. 7, 2019

(51) Int. Cl.
G06K 9/00 (2006.01)
H04N 5/235 (2006.01)
G06T 7/136 (2017.01)

(52) U.S. Cl.
CPC ..... *G06K 9/00288* (2013.01); *G06K 9/00228* (2013.01); *G06T 7/136* (2017.01); *H04N 5/2351* (2013.01); *H04N 5/2354* (2013.01); G06T 2207/30201 (2013.01)

(58) Field of Classification Search
CPC .......... G06K 9/00288; G06K 9/00228; H04N 5/2354; H04N 5/2351; G06T 7/136; G06T 2207/30201
See application file for complete search history.

(56) References Cited

U.S. PATENT DOCUMENTS

| 8,063,873 | B2 * | 11/2011 | Chen | G09G 3/3406 345/102 |
| 8,203,524 | B2 * | 6/2012 | Yoshida | H05B 33/0851 345/102 |
| 8,254,647 | B1 * | 8/2012 | Nechyba | G06K 9/00248 382/118 |
| 8,515,139 | B1 * | 8/2013 | Nechyba | G06K 9/6256 382/115 |
| 8,542,879 | B1 * | 9/2013 | Nechyba | G06K 9/00221 382/103 |
| 8,600,120 | B2 * | 12/2013 | Gonion | G06F 1/3231 382/118 |

(Continued)

*Primary Examiner* — Xuemei G Chen
(74) *Attorney, Agent, or Firm* — Patterson + Sheridan, LLP

(57) ABSTRACT

Certain aspects of the present disclosure provide techniques for performing face recognition in low light conditions using an electronic device. One aspect provides a method including determining if a brightness level within a viewing area of the electronic device satisfies a threshold. The method includes increasing a luminance output of the electronic device from a first luminance level to a second luminance level when the brightness level does not satisfy the threshold. The method includes capturing an image at the second luminance level when the brightness level does not satisfy the threshold. The method includes capturing the image at the first luminance level when the brightness level satisfies the threshold. The method includes detecting a face in the image. The method includes determining if the face corresponds to an authorized user. The method includes unlocking the electronic device when the face corresponds to an authorized user.

13 Claims, 4 Drawing Sheets

(56) References Cited

U.S. PATENT DOCUMENTS

| | | | |
|---|---|---|---|
| 8,601,009 B2* | 12/2013 | Yamazaki | G01N 35/085 |
| | | | 707/755 |
| 9,024,250 B2* | 5/2015 | Spraggs | G01J 1/0271 |
| | | | 250/221 |
| 9,035,851 B2* | 5/2015 | Noma | G09G 5/10 |
| | | | 345/1.1 |
| 9,495,004 B2* | 11/2016 | Cho | G06F 3/005 |
| 9,507,420 B2* | 11/2016 | Tartz | G08B 6/00 |
| 9,530,045 B2* | 12/2016 | Wang | G06K 9/00248 |
| 9,672,414 B2* | 6/2017 | Sunkavalli | G06K 9/00288 |
| 9,760,764 B2* | 9/2017 | Mishra | G06K 9/00241 |
| 10,319,311 B2* | 6/2019 | Du | G09G 3/3406 |
| 2008/0158113 A1* | 7/2008 | Ozawa | G09G 3/3406 |
| | | | 345/77 |
| 2010/0259639 A1* | 10/2010 | Hung | H04N 9/735 |
| | | | 348/223.1 |
| 2010/0271507 A1* | 10/2010 | Hung | H04N 5/23219 |
| | | | 348/231.99 |
| 2012/0019152 A1* | 1/2012 | Barnhoefer | H05B 41/3922 |
| | | | 315/158 |
| 2013/0050395 A1* | 2/2013 | Paoletti | H04N 7/142 |
| | | | 348/14.02 |
| 2013/0222564 A1* | 8/2013 | Park | G06K 9/2027 |
| | | | 348/77 |
| 2014/0132618 A1* | 5/2014 | Su | G09G 3/20 |
| | | | 345/589 |
| 2016/0284275 A1* | 9/2016 | Aflatooni | G09G 3/3258 |
| 2016/0360107 A1* | 12/2016 | Nabeshima | H04N 5/23241 |
| 2017/0132466 A1* | 5/2017 | Gousev | G06K 9/00604 |
| 2018/0090104 A1* | 3/2018 | Song | G09G 5/10 |
| 2018/0173980 A1* | 6/2018 | Fan | G06K 9/00906 |
| 2019/0188454 A1* | 6/2019 | Yuan | G06K 9/00 |

* cited by examiner

FACE RECOGNITION IN LOW LIGHT CONDITIONS FOR UNLOCKING AN ELECTRONIC DEVICE

INTRODUCTION

Aspects of the present disclosure relate to electronic devices, such as smartphones, and more particularly, to techniques for performing face recognition in low light conditions using an electronic device, such as for unlocking the electronic device.

Electronic devices, such as mobile devices (e.g., smartphones, tablets, laptops, etc.) may be susceptible to accidental activation while being carried. Inadvertent contact (e.g., from a foreign object, user's hand, surface, etc.) with the mobile device (e.g., with the touchscreen, a button, etc., of the mobile device) may be interpreted as user input, causing undesired actions to be taken on the mobile device.

Accordingly, many mobile devices include a locking feature to prevent such inadvertent contact from causing undesired actions to be taken on the mobile device. For example, the mobile device can be locked (e.g., manually, automatically such as after a period of inactivity, etc.) so it does not respond to user input unless some particular unlock operation is first performed.

In many cases, the locking feature may alternatively or additionally provide security for the mobile device. For example, the unlock operation may require some form of user authentication that prevents unauthorized users from accessing the mobile device. For example, to unlock the mobile device, a user may need to enter an appropriate pattern, passcode, or password on a touchscreen of the mobile device or be authorized according to some biometric identification of the user.

In some cases, face recognition is used at a mobile device to unlock the mobile device. Many mobile devices include an optical sensor (e.g., front-facing camera, a charge-coupled device (CCD), complementary metal-oxide semiconductor (CMOS), etc.) that is configured to capture an image of a user. Further, many such mobile devices are configured to run face recognition algorithms for performing face recognition of a user based on the captured image of the face of the user. Accordingly, the face recognition of the user may be used as a biometric identification of the user to unlock the mobile device. If the face of an authorized user is recognized, the mobile device unlocks. If the face of an authorized user is not recognized, the mobile device remains locked.

Use of the optical sensor in a mobile device in low light situations may lead to a low quality image for images captured using the optical sensor. For example, the optical sensor may have a limited sensor quality (e.g., small pixel size, low resolution, etc.) due to design constraints of the mobile device. Such an optical sensor may not be capable of capturing enough light during the image capture process, which may lead to a noisy, dark, washed out, flat, and/or improperly colored captured image. Accordingly, when such a captured image is used for face recognition, the face recognition algorithms may not accurately recognize the user in the captured image, and therefore the mobile device may not unlock successfully, thereby frustrating the user.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved face recognition techniques.

One aspect provides a method for performing face recognition in low light conditions using an electronic device. The method includes determining if a brightness level within a viewing area of the electronic device satisfies a threshold. The method includes increasing a luminance output of the electronic device from a first luminance level to a second luminance level when the brightness level does not satisfy the threshold. The method includes capturing an image at the second luminance level when the brightness level does not satisfy the threshold. The method includes capturing the image at the first luminance level when the brightness level satisfies the threshold. The method includes detecting a face in the image. The method includes determining if the face corresponds to an authorized user. The method includes unlocking the electronic device when the face corresponds to an authorized user.

Another aspect provides an electronic device. The electronic device includes an optical sensor configured to capture one or more images within a viewing area of the optical sensor. The electronic device includes a light emitting component. The electronic device includes a processor. The processor is configured to determine if a brightness level within the viewing area of the optical sensor satisfies a threshold. If the brightness level does not satisfy the threshold, the processor is configured to: increase a luminance of the light emitting component from a first luminance level to a second luminance level; and control the optical sensor to capture an image at the second luminance level. If the brightness level satisfies the threshold, the processor is configured to: control the optical sensor to capture the image at the first luminance level. The processor is configured to detect a face in the image. The processor is configured to determine if the face corresponds to an authorized user. The processor is configured to unlock the electronic device when the face corresponds to an authorized user.

Another aspect provides a computer readable medium having instructions stored thereon for causing an electronic device to perform a method for performing face recognition in low light conditions. The method includes determining if a brightness level within a viewing area of the electronic device satisfies a threshold. The method includes increasing a luminance output of the electronic device from a first luminance level to a second luminance level when the brightness level does not satisfy the threshold. The method includes capturing an image at the second luminance level when the brightness level does not satisfy the threshold. The method includes capturing the image at the first luminance level when the brightness level satisfies the threshold. The method includes detecting a face in the image. The method includes determining if the face corresponds to an authorized user. The method includes unlocking the electronic device when the face corresponds to an authorized user.

To the accomplishment of the foregoing and related ends, the one or more aspects comprise the features hereinafter fully described and particularly pointed out in the claims. The following description and the related drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for performing face recognition using an electronic device in low light conditions. Certain aspects are described herein with respect to using a mobile device to perform face recognition to unlock the mobile device. However, it should be understood that the techniques described herein for performing face recognition may additionally or alternatively be used for authenticating a user for other purposes than unlocking a mobile device. For example, the techniques for performing face recognition described herein may be used for authenticating a user for a mobile payment, for accessing an application, etc. Further, it should be understood that the techniques described herein may similarly be performed by any suitable electronic device, not just a mobile device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Figure 1:
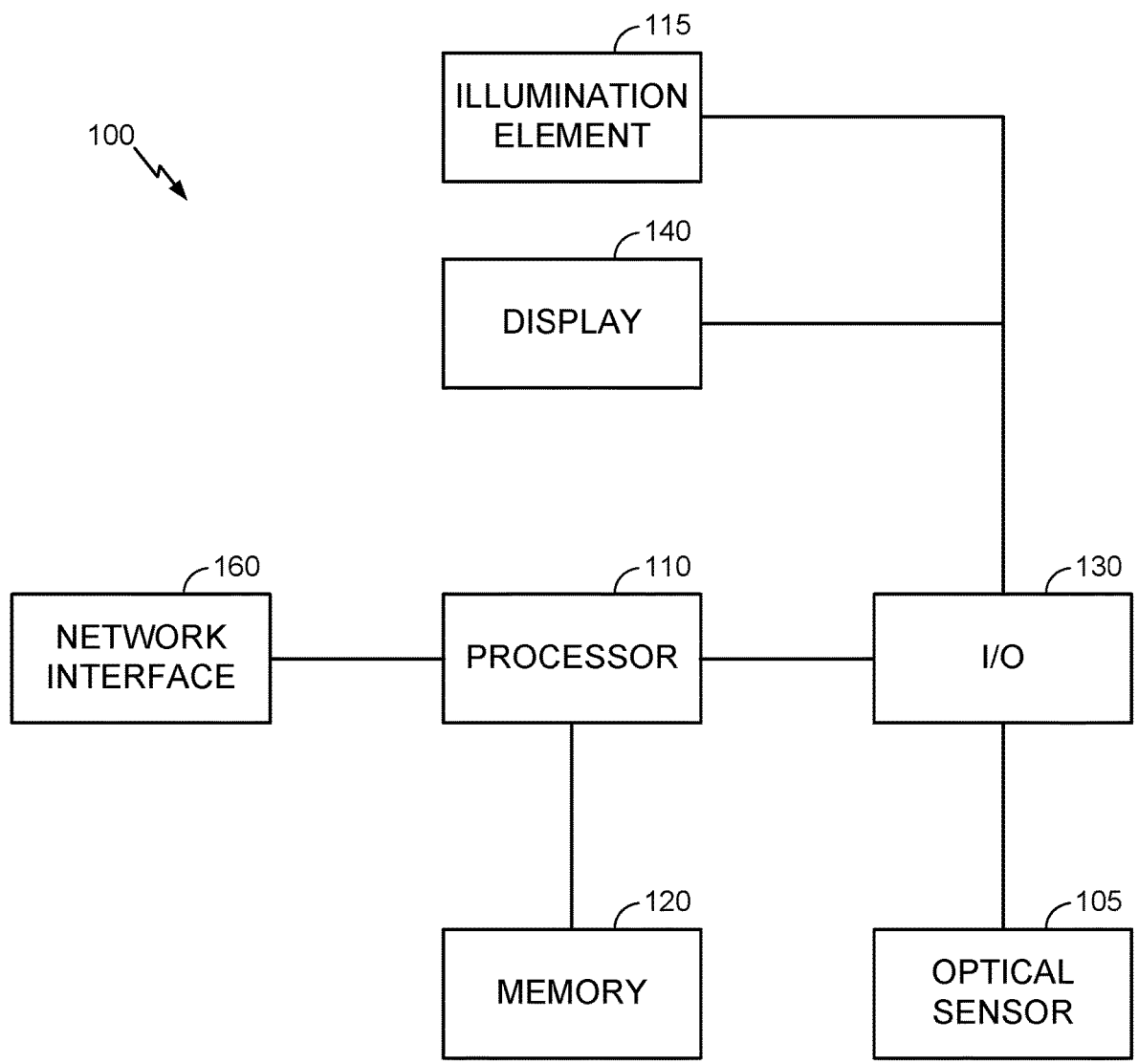
FIG. 1 is a functional block diagram of a mobile device in accordance with aspects of the present disclosure.

FIG. 1 is a functional block diagram of a mobile device 100. For example, the mobile device 100 may correspond to any appropriate mobile device including a smartphone, mobile phone, tablet, etc. The mobile device 100 may be configured to implement some or all of the teachings discussed herein. For example, the mobile device 100 may be configured to perform face recognition in low light conditions as described herein. The mobile device 100 may further be configured to authenticate a user of the mobile device 100 based on the face recognition performed, such as to unlock the mobile device 100.

The mobile device 100 includes a processor 110 in data communication with a memory 120, and an input/output interface 130. The input/output interface 130 is further in data communication with a display 140 (e.g., liquid crystal display (LCD), organic light emitting diode (OLED), active matrix OLED (AMOLED), etc.) and an optical sensor 105 (e.g., charge-coupled device (CCD), complementary metal-oxide semiconductor (CMOS), etc.). The display 140 is an example of a light emitting component. The input/output interface 130 is also optionally in data communication with a dedicated illumination element 115 (e.g., flash, LED (light emitting diode) light, xenon light, flashtube, etc.). The illumination element 115 is another example of a light emitting component. The processor 110 is further in data communication with a network interface 160. Although described separately, it is to be appreciated that functional blocks described with respect to the mobile device 100 need not be separate structural elements. For example, the processor 110 and memory 120 may be embodied in a single chip. Similarly, two or more of the processors 110, and network interface 160 may be embodied in a single chip. The mobile device 100 may be configured to perform the functions described herein. For example, the processor 110 may be configured to execute instructions stored in the memory 120 that cause the mobile device 100 to perform the functions and processes described herein.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses, to read information from or write information to memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include, for example, flash memory, flash drives, non-volatile RAM (NVRAM), read only memory, etc.

The processor 110 is also coupled to an input/output interface 130 for, receiving input from and providing output to, devices connected to or integrated as part of the mobile device 100. Examples of such devices include, but are not limited to, keys, buttons, sensors, switches, a pointing device, a remote device, an infrared detector, a camera sensor (e.g., optical sensor 105), a motion detector, a microphone (possibly coupled to audio processing software to, e.g., detect voice commands), visual output devices such as a touch-screen display (e.g., display 140), audio output devices, including speakers, headphones, earphones, and alarms, and haptic output devices, including force-feedback and vibrating devices. The input/output interface 130 may use one or more protocols to, wirelessly or through a wired connection, communicate with devices including but not limited to universal serial bus (USB), FireWire, Thunderbolt, Light Peak, digital video interface (DVI), high-definition multimedia interface (HDMI), video graphics array (VGA), peripheral component interconnect (PCI), etc.

The processor 110 is further coupled to a network interface 160. The network interface 160 may comprise one or more modems. The network interface 160 prepares data generated by the processor 110 for transmission to a network or another device. The network interface 160 may also demodulate data received via the network. The network interface 160 can include a transmitter, receiver, or both (e.g., a transceiver). In other aspects, the transmitter and receiver are two separate components. The network interface 160, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The network interface 160 may be a wired interface (e.g., Ethernet, local area network (LAN), etc.) and/or a wireless interface (e.g., Long-Term Evolution (LTE), wireless local area network (WLAN), WiFi, code division multiple access (CDMA), 5 G, new radio (NR), etc.), global system for mobile communications (GSM), worldwide interoperability for microwave access (WiMax), Bluetooth, etc.).

Figure 2:
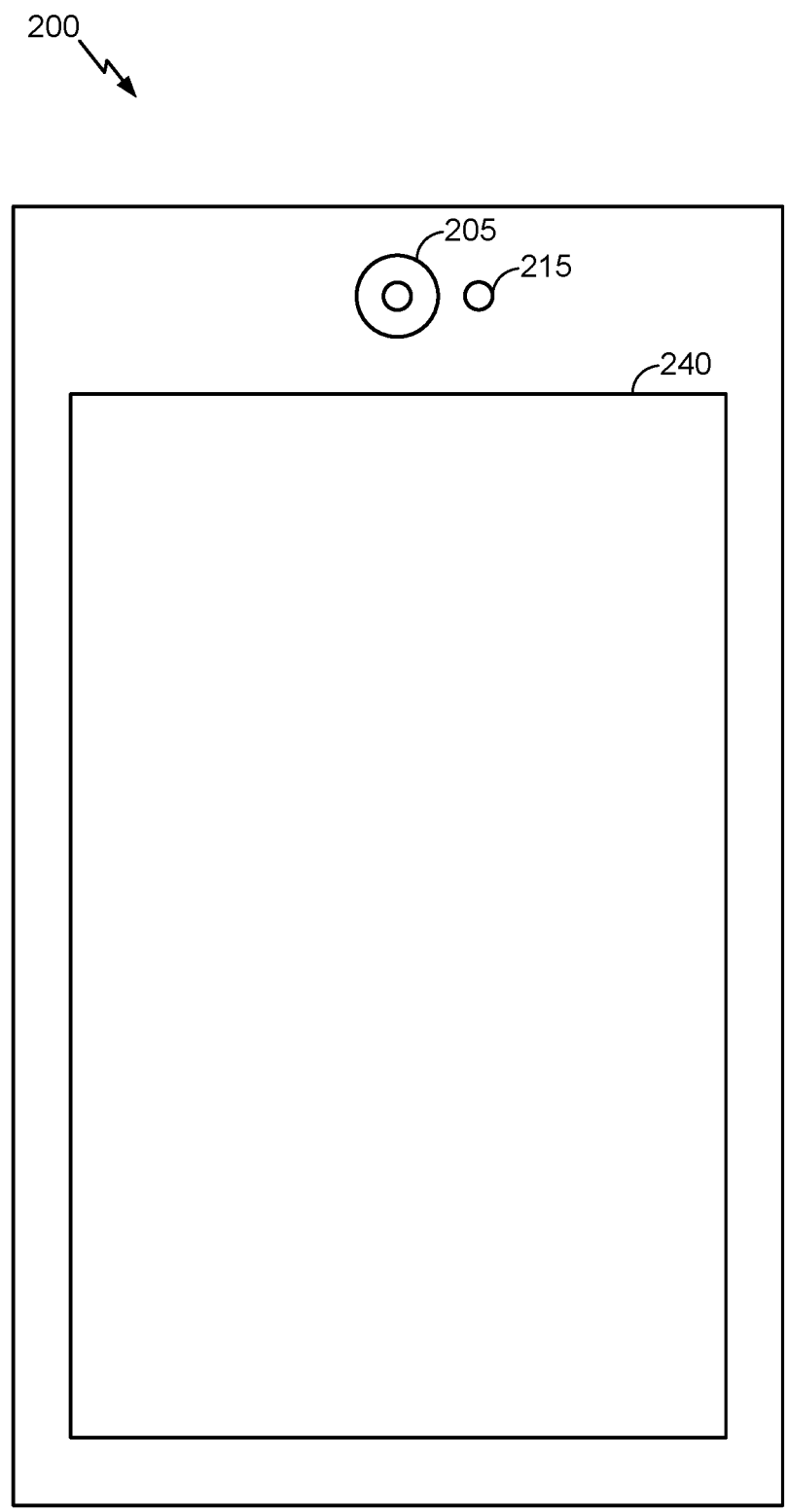
FIG. 2 is an illustration of an example mobile device in accordance with aspects of the present disclosure.

FIG. 2 is an illustration of an example mobile device 200. The mobile device 200, in some aspects, may correspond to a physical implementation of the mobile device 100. As shown, the mobile device 200 is a smartphone type device. The mobile device 200 includes an optical sensor 205 (e.g., corresponding to optical sensor 105), a display 240 (e.g., corresponding to display 140), and optionally a dedicated illumination element 215 (e.g., corresponding to illumination element 115). As can be seen, the optical sensor 205, display 240, and dedicated illumination element 215 are all facing the same direction. The optical sensor 205, accordingly, may be referred to as a front-facing optical sensor that faces the same direction as a display of the mobile device 200. Internally, the mobile device 200 may have other components, such as one or more of the components described with respect to mobile device 100 that perform functions described with respect to mobile device 100. For example, the mobile device 200 may be configured to implement some or all of the teachings discussed herein. For example, the mobile device 200 may be configured to perform face recognition in low light conditions as described herein. The mobile device 200 may further be configured to authenticate a user of the mobile device 200 based on the face recognition performed, such as to unlock the mobile device 200.

Example Methods and Apparatuses for Performing Face Recognition in Low Light Conditions Conventional methods for performing face recognition on a mobile device may include capturing an image of a user including a face of the user using a front-facing optical sensor of the mobile device. Further, a processor of the mobile device runs a face recognition algorithm for performing face recognition of the user based on the captured image of the face of the user. The face recognition of the user may be used as a biometric identification of the user to unlock the mobile device. If the face of an authorized user is recognized, the mobile device unlocks. If the face of an authorized user is not recognized, the mobile device remains locked.

In certain cases, a mobile device may not be able to recognize the face of an authorized user even when the captured image includes the face of the authorized user. For example, the optical sensor may have a limited sensor quality (e.g., small pixel size, low resolution, etc.) due to design constraints of the mobile device. Such an optical sensor may not be capable of capturing enough light during the image capture process, which may lead to a noisy, dark, washed out, flat, and/or improperly colored captured image. Accordingly, when such a captured image is used for face recognition, the face recognition algorithms may not accurately recognize the user in the captured image, and therefore the mobile device may not unlock successfully.

Certain aspects herein provide techniques for performing face recognition of a user in low light conditions. Certain techniques are described as performed by mobile device 100 of FIG. 1, however, it should be noted that any suitable electronic device may be configured to perform the techniques described herein.

Figure 3:
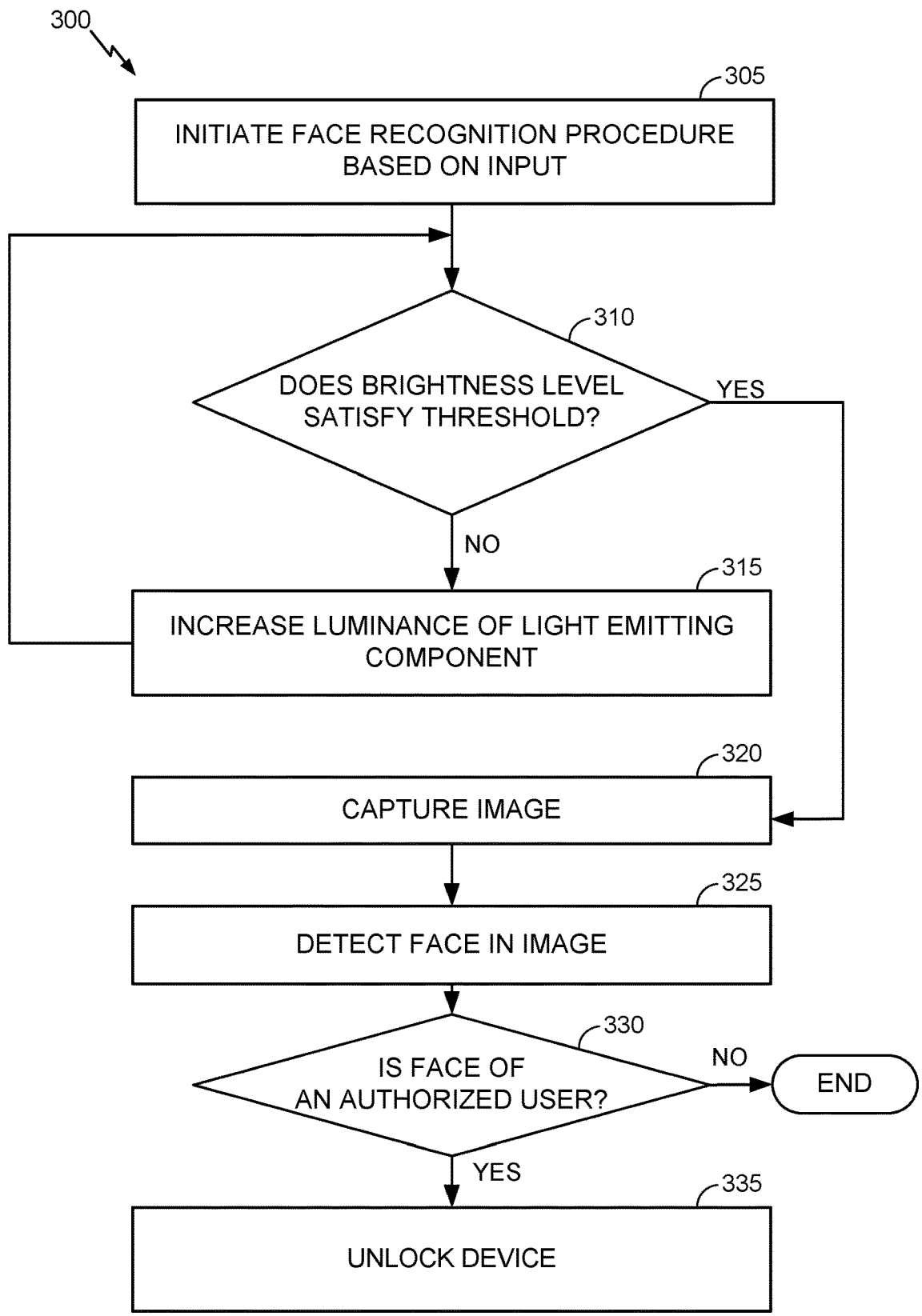
FIG. 3 illustrates example operations for performing face recognition that may be performed by an electronic device, in accordance with aspects of the present disclosure.

FIG. 3 illustrates example operations 300 for performing face recognition that may be performed by an electronic device, in accordance with aspects of the present disclosure. For example, operations 300 may be performed by mobile device 100 (e.g., as controlled by processor 110).

In certain aspects, at block 305, an electronic device initiates a face recognition procedure. For example, in certain aspects, mobile device 100 is configured to initiate a face recognition procedure based on an input received at the mobile device 100. In particular, by only performing face recognition when an input is received, as opposed to continuously performing face recognition, power may be saved at the mobile device 100.

For example, when the mobile device 100 is locked (e.g., at a lock screen) and a user presses a button (e.g., home button, power button, etc.) on the mobile device 100, the mobile device 100 begins performing face recognition. In another example, mobile device 100 may be configured to perform face recognition after receiving a voice command from a user. In yet another example, mobile device 100 may include one or more acceleration sensors, such as accelerometers, that measure motion of the mobile device 100 relative to one or more axes. The accelerometers may be in the form of, for example, microelectromechanical system (MEMS) sensors. In some cases, an accelerometer may be able to measure acceleration in multiple axes at once, such as a two- or three-axis motion sensor. The accelerometers may detect a user interacting with the mobile device 100, such as a user tapping on the mobile device 100 or picking up the mobile device 100 off of a surface. Mobile device 100 may be configured to perform face recognition after detecting such a user interaction.

Continuing, at block 310, the electronic device determines if a brightness level (e.g., luminance/brightness) within a viewing area of the electronic device satisfies a threshold. For example, in certain aspects, processor 110 initially determines if a brightness level within a viewing area of optical sensor 105 satisfies a brightness threshold.

In certain aspects, mobile device 100, in addition to the optical sensor 105, may include a light sensor (e.g., an ambient light sensor/detector) configured to measure light and send information indicative of the measurement to processor 110. In certain aspects, the light sensor may face the same direction as optical sensor 105. If the measurement (e.g., luminance/brightness) is below the brightness threshold, a face may not be detectable in an image captured by optical sensor 105, and therefore the processor 110 may not be able to perform face recognition on the image. Accordingly, in certain aspects, if the measurement of the brightness level from the light sensor is below the brightness threshold, the processor 110 determines the brightness level does not satisfy the brightness threshold. If the measurement of the brightness level from the light sensor is equal to or above the brightness threshold, the processor 110 determines the brightness level satisfies the brightness threshold.

Alternatively or additionally to processor 110 determining if the brightness level satisfies a brightness threshold based on a measurement from a light sensor, in certain aspects, processor 110 is configured to receive a captured image from the optical sensor 105 and determine whether the captured image satisfies a parameter threshold as indicative of if the brightness level satisfies a brightness threshold (e.g., different than or the same as the brightness threshold for the light sensor). For example, in certain aspects, processor 110 is configured to cause optical sensor 105 to capture an image. In certain aspects, processor 110 is configured to control display 140 to display an image corresponding to the current view of the optical sensor 105 (e.g., in real-time) during the image capture process. Accordingly, a user may position the view of the optical sensor 105 to include the face of the user using visual feedback from the display 140. Optical sensor 105 is configured to send data indicative of the image to processor 110.

The processor 110 may be configured to determine whether the captured image is suitable for performing face recognition by determining if the captured image satisfies a parameter threshold as indicative of if the brightness level satisfies a brightness threshold. In certain aspects, the processor 110 is configured to determine if one or more parameters (e.g., luminance, brightness, face contour detectability, etc.) of the captured image satisfy one or more respective parameter thresholds as indicative of if the brightness level satisfies a brightness threshold.

For example, processor 110 may be configured to determine whether a luminance/brightness of the image is greater than or equal to a parameter threshold. If the luminance/brightness is greater than or equal to the parameter threshold, the processor 110 may determine the captured image satisfies the parameter threshold and thus the brightness level satisfies the brightness threshold. If the luminance/brightness is less than the parameter threshold, the processor 110 may determine the captured image does not satisfy the parameter threshold and thus the brightness level does not satisfy the brightness threshold. For example, if the luminance/brightness is below the parameter threshold, a face may not be detectable in the image, and therefore the processor 110 may not be able to perform face recognition on the image.

In another example, the processor 110 is configured to determine if any face is detectable in the image as a parameter threshold. For example, the processor 110 is configured to determine whether contours of a face are detectable in the image, indicating that a face is present in the image. If there is no face detectable in the image, the processor 110 may not be able to perform face recognition on the image and the parameter threshold is not satisfied indicating the brightness level does not satisfy the brightness threshold. If there is a face detectable in the image, the parameter threshold is satisfied indicating the brightness level satisfies the brightness threshold.

If the electronic device determines the brightness level within the viewing area of the electronic device satisfies the threshold, operations 300 continue to block 320. If the electronic device determines the brightness level within the viewing area of the electronic device does not satisfy the threshold, operations 300 continue to block 315.

At block 315, the electronic device is configured to increase a luminance of a light emitting component of the electronic device. For example, in certain aspects, the processor 110 is configured to control illumination element 115 and/or display 140 to output a greater amount of light (e.g., increase brightness), thereby increasing a brightness level in a viewing area of the optical sensor 105. Such an increase in the brightness level may improve the quality of an image captured by the optical sensor 105, thereby leading to a more accurate face recognition using the captured image.

In certain aspects, the processor 110 initially sets the luminance output of illumination element 115 and/or display 140 at a minimum (e.g., minimum brightness, current brightness, off, etc.) after block 305 and before block 310.

In certain aspects, the processor 110 is configured to incrementally increase the luminance output of illumination element 115 and/or display 140, such as a by a fixed or variable increment. In certain aspects, for the first iteration of block 315, the processor 110 is configured to increase the luminance output of illumination element 115 and/or display 140 based on a measured parameter (e.g., luminance/brightness) from the optical sensor 105 and/or light sensor. For example, the processor 110 may increase the output as a function of the measured parameter (in an amount proportional or based on the parameter).

In certain aspects, the processor 110 is configured to first increase a luminance output of the display 140 to a maximum level of display 140 and only turns on or increases a luminance output of illumination element 115 after display 140 is at its maximum level.

After block 315, operations 300 return to block 310. In certain aspects, the electronic device iteratively goes from block 310 to block 315 and incrementally increase the luminance (e.g., from an initial first luminance level to a final second luminance level) until the electronic device determines the brightness level within the viewing area of the electronic device satisfies the threshold and operations 300 continue to block 320.

At block 320, the electronic device captures an image including a face of a user. For example, in certain aspects, processor 110 is configured to cause optical sensor 105 to capture an image. In certain aspects, processor 110 is configured to control display 140 to display an image corresponding to the current view of the optical sensor 105 (e.g., in real-time) during the image capture process. Accordingly, a user may position the view of the optical sensor 105 to include the face of the user using visual feedback from the display 140. Optical sensor 105 is configured to send data indicative of the image to processor 110. In certain aspects, after capturing the image, processor 110 is configured to control illumination element 115 and/or display 140 to reduce its luminance output to an initial luminance level (e.g., initial first luminance level), minimum, etc.

Continuing, at block 325, the electronic device detects a face in the image. For example, in certain aspects, processor 110 runs a face recognition algorithm on the image, which in part detects a face in the image.

Further, at block 330, the electronic device determines if the detected face corresponds to an authorized user of the electronic device. For example, in certain aspects, processor 110 runs a face recognition algorithm on the image, which in part determines if the detected face corresponds to an authorized user of the mobile device 100. For example, information indicative of one or more authorized users may be stored (e.g., securely, encrypted, etc.) on the mobile device 100 (e.g., in memory 120) ore remotely accessible by the mobile device 100 (e.g., via network interface 160). The face recognition algorithm may determine if information indicative of the detected face corresponds to information indicative of one or more authorized users. If the information indicative of the detected face corresponds to information indicative of one of the one or more authorized users, the processor 110 determines the detected face corresponds to an authorized user of the mobile device 100. If the information indicative of the detected face does not correspond to information indicative of any of the one or more authorized users, the processor 110 determines the detected face does not correspond to an authorized user of the mobile device 100.

If at block 330, the electronic device determines the detected face does not correspond to an authorized user, operations 300 end. If at block 330, the electronic device determines the detected face corresponds to an authorized user, operations 300 continue to block 335. At block 335, the electronic device unlocks. For example, processor 110 unlocks the mobile device 100 so a user can interact with mobile device 100.

Figure 4:
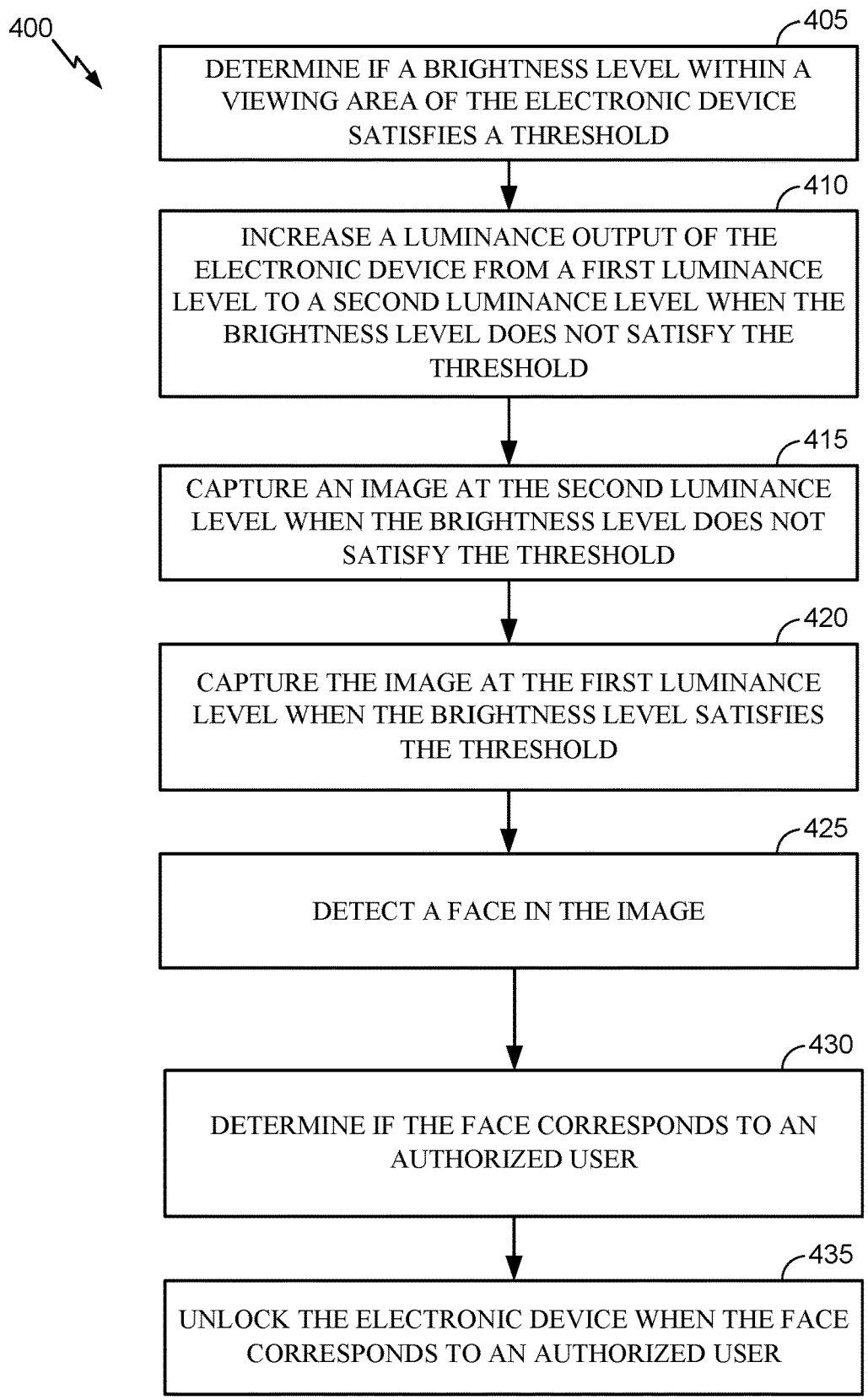
FIG. 4 illustrates example operations for performing face recognition that may be performed by an electronic device, in accordance with aspects of the present disclosure.

FIG. 4 illustrates example operations 400 for performing face recognition that may be performed by an electronic device, in accordance with aspects of the present disclosure.

At block 405, the electronic device determines if a brightness level within a viewing area of the electronic device satisfies a threshold. At block 410, the electronic device increases a luminance output of the electronic device from a first luminance level to a second luminance level when the brightness level does not satisfy the threshold. At block 415, the electronic device captures an image at the second luminance level when the brightness level does not satisfy the threshold. At block 420, the electronic device captures the image at the first luminance level when the brightness level satisfies the threshold. At block 425, the electronic device detects a face in the image. At block 430, the electronic device determines if the face corresponds to an authorized user. At block 435, the electronic device unlocks the electronic device when the face corresponds to an authorized user.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a wireless communication device, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An electronic device comprising:
    an optical sensor configured to capture one or more images within a viewing area of the optical sensor;
    a light emitting component;
    a dedicated illumination element; and
    a processor configured to:
        determine if a brightness level within the viewing area of the optical sensor satisfies a threshold, wherein the brightness level satisfying the threshold comprises the optical sensor detecting a face;
        if the brightness level does not satisfy the threshold:
            increase a luminance of the light emitting component from a first luminance level to a second luminance level, the second luminance level being a maximum luminance level of the light emitting component; and control the optical sensor to capture an image at the second luminance level, wherein if the second luminance level does not satisfy the threshold, incrementally increasing a luminance output of the dedicated illumination element until the brightness level satisfies the threshold;

if the brightness level satisfies the threshold:
control the optical sensor to capture the image at the first luminance level;
detect the face in the image;
determine if the face corresponds to an authorized user; and
unlock the electronic device when the face corresponds to the authorized user.

2. The electronic device of claim 1, wherein the processor is configured to determine the brightness level based on information from the optical sensor, wherein the optical sensor comprises a camera.

3. The electronic device of claim 1, further comprising a light sensor that is separate from the optical sensor, wherein the processor is configured to determine the brightness level based on information from the light sensor.

4. The electronic device of claim 1, wherein the luminance of the light emitting component at the first luminance level is the light emitting component being off.

5. The electronic device of claim 1, wherein to increase the luminance of the light emitting component from the first luminance level to the second luminance level comprises to:
calculate a luminance level for the light emitting component as a function of a brightness detected by at least one of the optical sensor or a light sensor.

6. The electronic device of claim 1, further comprising, if the brightness level does not satisfy the threshold, decreasing the luminance of the light emitting component to the first luminance level after controlling the optical sensor to capture the image at the second luminance level.

7. The electronic device of claim 1, further comprising receiving a user input, wherein determining the brightness level is based on receiving the user input.

8. A method for performing face recognition in low light conditions using an electronic device, the method comprising:
determining if a brightness level within a viewing area of the electronic device satisfies a threshold, wherein the brightness level satisfying the threshold comprises detection of a face in the viewing area;
increasing a luminance output of a light emitting component of the electronic device from a first luminance level to a second luminance level when the brightness level does not satisfy the threshold, the second luminance level being a maximum luminance level of the light emitting component;
capturing an image at the second luminance level when the brightness level does not satisfy the threshold, wherein if the second luminance level does not satisfy the threshold, incrementally increasing a luminance output of a dedicated illumination element of the electronic device until the brightness level satisfies the threshold;
capturing the image at the first luminance level when the brightness level satisfies the threshold;
detecting the face in the image;
determining if the face corresponds to an authorized user; and
unlocking the electronic device when the face corresponds to the authorized user.

9. The method of claim 8, further comprising determining the brightness level based on information from a camera.

10. The method of claim 8, further comprising determining the brightness level based on information from a sensor separate from a camera used for capturing the image.

11. The method of claim 8, wherein increasing the luminance output from the first luminance level to the second luminance level comprises:
calculating a luminance level as a function of a detected brightness.

12. A non-transitory computer readable medium having instructions stored thereon for causing an electronic device to perform a method for performing face recognition in low light conditions, the method comprising:
determining if a brightness level within a viewing area of the electronic device satisfies a threshold, wherein the brightness level satisfying the threshold comprises detection of a face in the viewing area;
increasing a luminance output of a light emitting component of the electronic device from a first luminance level to a second luminance level when the brightness level does not satisfy the threshold, the second luminance level being a maximum luminance level of the light emitting component;
capturing an image at the second luminance level when the brightness level does not satisfy the threshold, wherein if the second luminance level does not satisfy the threshold, incrementally increasing a luminance output of a dedicated illumination element of the electronic device until the brightness level satisfies the threshold;
capturing the image at the first luminance level when the brightness level satisfies the threshold;
detecting the face in the image;
determining if the face corresponds to an authorized user; and
unlocking the electronic device when the face corresponds to the authorized user.

13. The non-transitory computer readable medium of claim 12, wherein increasing the luminance output from the first luminance level to the second luminance level comprises:
calculating a luminance level as a function of a detected brightness.

* * * * *